United States Patent
Stacy et al.

(10) Patent No.: US 7,225,583 B1
(45) Date of Patent: Jun. 5, 2007

(54) FISH ATTRACTOR

(76) Inventors: Emmett E. Stacy, 9626 Kilrenny, Spring, TX (US) 77379; Ella R. Stacy, 9626 Kilrenny, Spring, TX (US) 77379

( * ) Notice: Subject to any disclaimer, the term of this patent is extended or adjusted under 35 U.S.C. 154(b) by 0 days.

(21) Appl. No.: 11/499,949

(22) Filed: Aug. 7, 2006

(51) Int. Cl.
*A01K 97/02* (2006.01)

(52) U.S. Cl. ............................ 43/44.99; 43/17.5
(58) Field of Classification Search ............... 43/44.99, 43/17.5
See application file for complete search history.

(56) References Cited

U.S. PATENT DOCUMENTS

| | | | |
|---|---|---|---|
| 2,709,317 A * | 5/1955 | Pease, Sr. .................. 43/44.99 |
| 4,138,794 A * | 2/1979 | Chiodini .................... 43/43.14 |
| 4,235,198 A * | 11/1980 | Goguel ..................... 119/51.04 |
| 4,685,242 A * | 8/1987 | Stanish ...................... 43/44.99 |
| 4,903,429 A | 2/1990 | Tetenes |
| 4,916,845 A | 4/1990 | Aydelette, Sr. |
| 5,566,499 A | 10/1996 | Washecka |
| 5,617,669 A * | 4/1997 | Levey ....................... 43/44.99 |
| 6,530,171 B2 * | 3/2003 | Stevens et al. ............. 43/44.99 |
| 6,711,849 B1 * | 3/2004 | Moretti ...................... 43/44.99 |
| 6,877,268 B2 | 4/2005 | Kutzner |
| 7,152,363 B1 * | 12/2006 | Garcia-Cruz ............... 43/44.99 |

* cited by examiner

*Primary Examiner*—Kurt Rowan
(74) *Attorney, Agent, or Firm*—Donald R. Schoonover

(57) ABSTRACT

A fish attractor for attracting fish including a transparent and/or translucent food-containing member with a plurality of orifices; a transparent and/or translucent light-emitting member removably mounted on the food-containing member and including a battery-powered, light-emitting system; a buoyancy member including a top element removably and sealingly mounted on the light-emitting member; a sound-generating member secured to the top element capable of producing fish clicking sounds; an anchoring member secured to the food-containing member; and a retrieval mechanism secured to the light-emitting member.

12 Claims, 3 Drawing Sheets

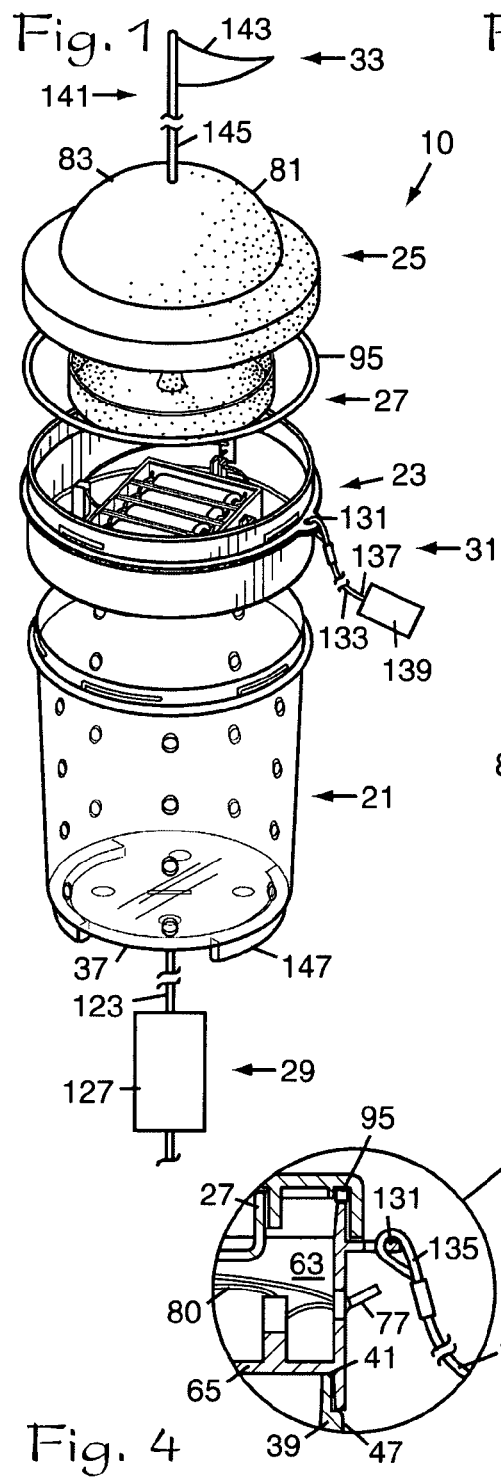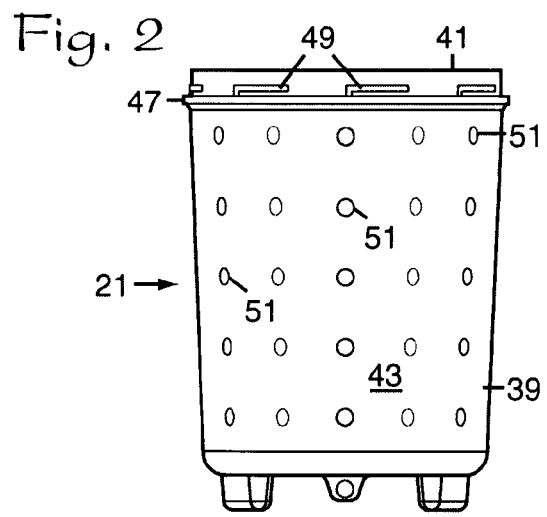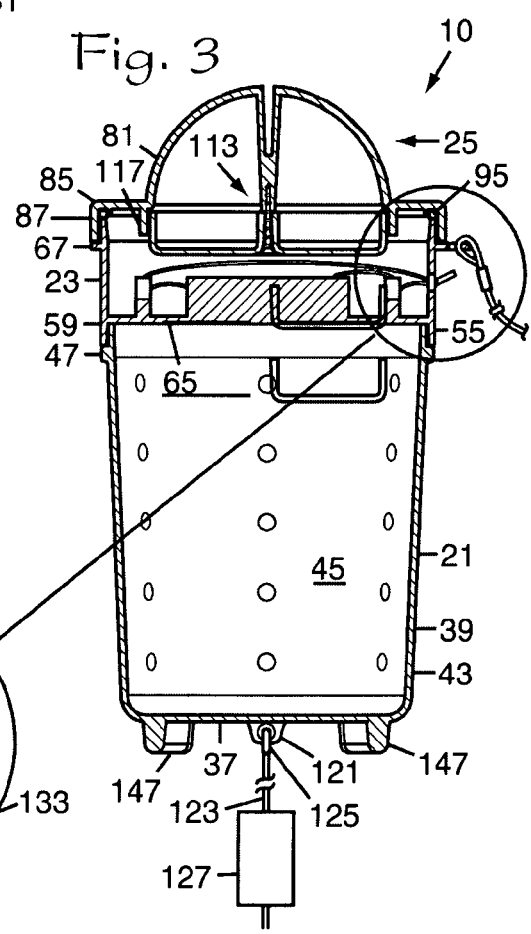

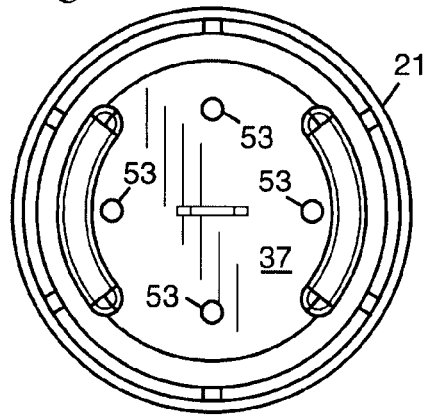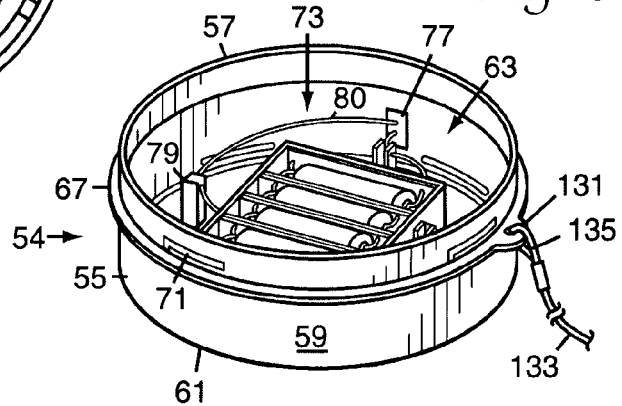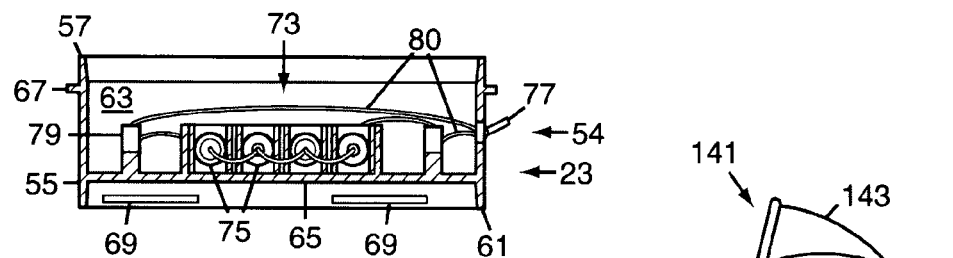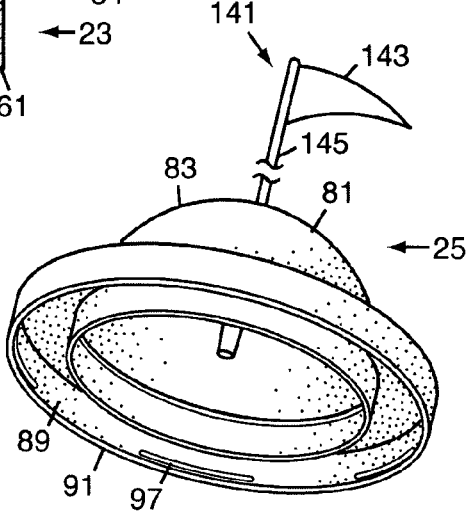

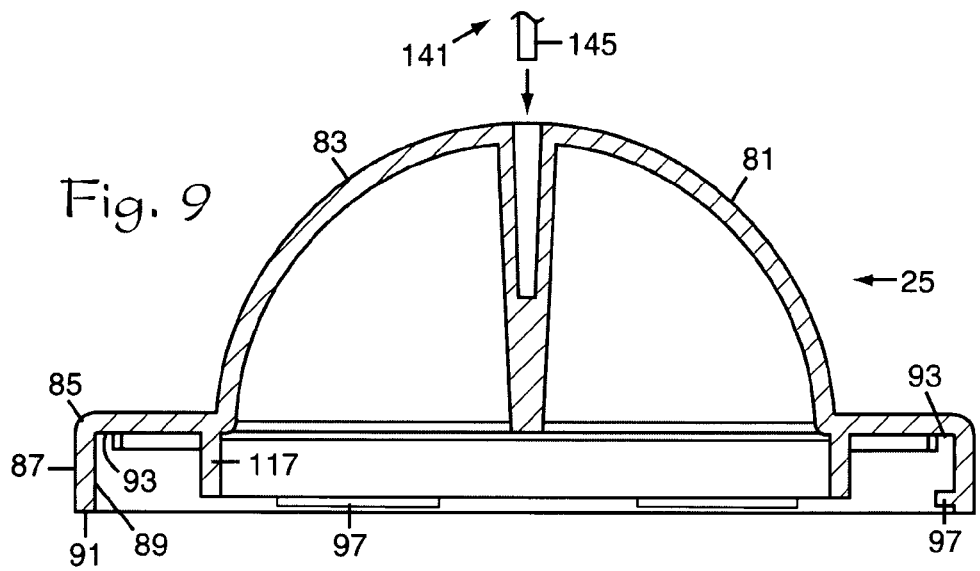
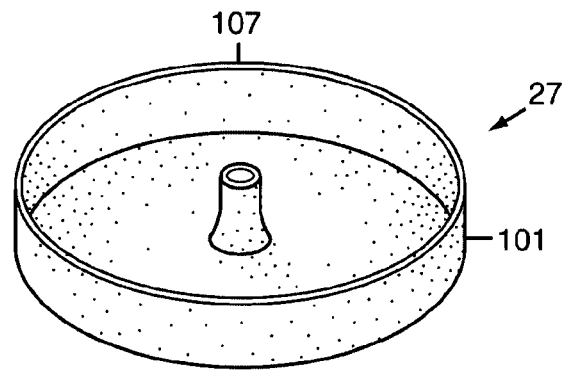
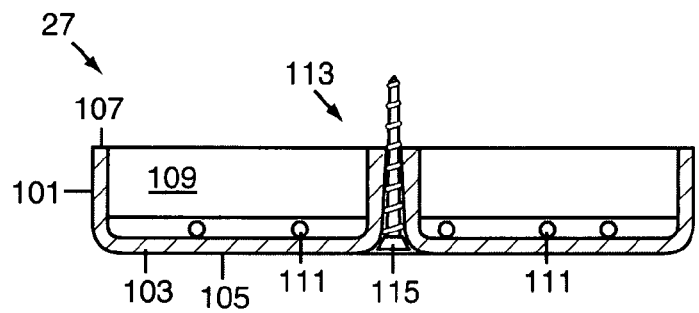

FISH ATTRACTOR

BACKGROUND OF THE INVENTION

1. Field of the Invention

The present invention relates to sporting goods and, more specifically without limitation, to fishing equipment accessories.

2. Description of the Related Art

Although there are variations, fishing can be basically described as one person against one fish wherein a real or artificial bait is used to catch a fish that happened to be in the vicinity of the bait. Different species of fish are attracted by various sensory perceptions or combinations thereof such as sight, sound, water vibrations, smell, etc. For example, real bait on a hook such as a worm, a part or whole of small fish, insect, or animal may be impaled on a hook and dangled from the end of a fishing pole. As for artificial bait which may be a cloth or sponge soaked in a substance having a strong odor, or a lure being trolled through the water. If a fish feels the presence of a hook while attempting to steal bait from a stationary location or from a moving lure, the chance to snag that fish is probably lost for the day.

What is needed is an apparatus that can be used to attract several fish to a desired location and then fish at that location in a attempt to snag one or more of the attracted fish. In order to attract species of fish which are attracted by sight, such as apparatus should be able to provide light/dark contrast, or provide moving or shiny movements of live bait such as worms or small bait fish, i.e., minnows, shiners, etc.

Also, in order to attract species of fish which are attracted by sound and/or water vibrations, such as apparatus should be able to provide water vibrations or sounds such as clicking sounds that emulate the sound produced by chad bait fish.

Further, in order to attract species of fish which are attracted by smell, such as apparatus should be able to provide various fish-attracting scents.

Finally, such an apparatus should be able to selectively provide various combinations of sight, sound, water vibrations, and/or smell.

Preferably, such an apparatus can be embodied in a relatively small portable unit that includes a means for anchoring the unit at a desired location, that can be used and retrieved by a bank fisherman, and that includes a location-indicating feature should a boat fisherman and the unit drift apart.

Various prior art fish attractors have been developed some of the features hereinbefore described but there is always room for further improvement as hereinafter described in detail.

SUMMARY OF THE INVENTION

The improvements of the present invention for a fish attractor for attracting fish in a body of water include a food-containing member, a light-emitting member, a buoyancy member, a sound-generating member, an anchoring member, a retrieval mechanism, and a location indicating member.

The food-containing member is constructed at least partially of translucent and/or transparent material and includes a lower end element; a cylindrically shaped first sidewall having a first upper edge, a first outer surface, and surrounding a first internal cavity; a first ledge extending radially outwardly from the first outer surface and spaced apart from the first upper edge; two or more first partial threads extending outwardly from the first outer surface and spaced between the first ledge and the first upper edge and a plurality of orifices through the first sidewall and/or the lower end element.

The light-emitting member is constructed at least partially of translucent and/or transparent material and includes a cylindrically shaped second sidewall having a second outer surface and a lower edge, the second sidewall at the lower edge dimensioned to slidably and telescopingly engage the first sidewall of the food-containing member; two or more second partial threads extending inwardly from the second sidewall and spaced near the lower edge, the two or more second partial threads being dimensioned and configured to threadingly mate with the two or more first partial threads, wherein the light-emitting member is removably securable on the food-containing member by threadingly mating the two or more second partial threads with the two or more first partial threads; an horizontally oriented platform spaced apart from the lower edge, forming a fluid-tight seal with the second sidewall, and further forming a second internal cavity spaced within the second sidewall and above the platform; at least one battery compartment securely mounted on the platform and in the second internal cavity; a battery removably mounted in each at least one battery compartment; a selectively activatable switch sealingly mounted in the second sidewall and operable from the second outer surface; at least one LED lighting device mounted in the second internal cavity, and circuitry interconnecting each battery contained in each at least one battery compartment and the at least one LED lighting device with the switch.

The buoyancy member includes a dome-shaped top element having a contrastingly colored upper surface and a circularly shaped peripheral edge; a third sidewall having an inner surface with a lower edge, the third sidewall depending downwardly from the peripheral edge and being dimensioned to slidably and telescopingly engage the second sidewall; a groove formed in the top element along the third sidewall; an O-ring positioned in the groove; and two or more fourth partial threads extending inwardly from the inner surface and spaced adjacent to the lower edge, the two or more fourth partial threads being dimensioned and configured to threadingly mate with the two or more third partial threads, thereby removably securing the top element to the light-emitting member and compressing the O-ring between the groove and the first upper edge to thereby form a fluid-tight seal between the first sidewall and the top element.

The sound-generating member includes a tray element having a tray bottom element and a tray sidewall having a tray upper edge and surrounding a tray internal cavity; a plurality of spherically shaped elements spaced loosely in the tray element; and securing means for securing the tray element to the top element wherein the tray element is disposed within the second internal cavity of the light-emitting member and the plurality of spherically shaped elements are captured in the tray internal cavity.

The anchoring member includes a first attaching device secured to the lower end element of the food-containing member; an elongate and flexible first connecting device having a proximal end secured to the first attaching device; and a ballast device adjustably connected to the first connecting device.

The retrieval mechanism includes a second attaching device secured to the first ledge of the food-containing member; and an elongate and flexible second connecting device having a proximal end secured to the second attaching device and a distal end for securing the fish attractor to a remote object.

The location indicating member includes the top element having a receiving mechanism; and an elongate indicator device removably connected to the receiving mechanism and extending generally vertically upwardly from the top element.

A substantial portion of the fish attractor is operatively buoyed above the surface of a body of water and pitching and rolling of the fish attractor causes the plurality of spherically shaped devices to roll around in the tray element colliding with each other and with the tray sidewall thereby generating audio emulating fish clicking sounds.

PRINCIPAL OBJECTS AND ADVANTAGES OF THE INVENTION

The principal objects and advantages of the present invention include: providing a fish attractor that can attract species of fish which are attracted by sight by producing light/dark contrast or by providing moving or shiny, flashing movements of live bait such as worms or small bait fish; providing such a fish attractor that can attract species of fish which are attracted by producing water vibrations or sounds such as clicking sounds that emulate the sound produced by chad bait fish; providing such a fish attractor that can attract species of fish which are attracted by smell by provide various fish-attracting scents; providing such a fish attractor that can selectively provide various combinations of sight, sound, water vibrations and/or smell; providing such a fish attractor that is embodied in a relatively small portable unit; providing such a fish attractor that includes a means for anchoring the unit at a desired location; providing such a fish attractor that can be used and retrieved by a bank fisherman; providing such a fish attractor that includes a location-indicating feature should a boat fisherman and the unit drift apart; and generally providing such a fish attractor that is reliable in performance, capable of long lasting life, and is particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is an exploded perspective view of a fish attractor in accordance with the present invention.

FIG. 2 is an enlarged side elevational view of a food-containing member of the fish attractor.

FIG. 3 is an enlarged and fragmentary, cross-sectional view of the fish attractor.

FIG. 4 is a further enlarged, cross-sectional view of the portion encircled in FIG. 3.

FIG. 5 is an enlarged bottom plan view of the food-containing member of the fish attractor.

FIG. 6 is an enlarged perspective view of a light-emitting member of the fish attractor.

FIG. 7 is an enlarged, cross-sectional view of the light-emitting member of the fish attractor.

FIG. 8 is an enlarged perspective view of a top element of the fish attractor.

FIG. 9 is a further enlarged and cross-section view of the top element of the fish attractor.

FIG. 10 is an enlarged perspective view of a tray element of the fish attractor.

FIG. 11 is an enlarged cross-sectional view of the tray element of the fish attractor according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a fish attractor in accordance with the present invention, as shown in FIGS. 1–11. The fish attractor 10 includes a food-containing member 21, a light-emitting member 23, a buoyancy member 25, a sound-generating member 27, an anchoring member 29, a retrieval mechanism 31, and a locating member 33.

The food-containing member 21, which is at least partially constructed of translucent and/or transparent material, includes a lower end element 37; a cylindrically shaped first sidewall 39 having a first upper edge 41, a first outer surface 43, and surrounding a first internal cavity 45. A first ledge 47 extends radially outwardly from the first outer surface 43 and is spaced apart from the first upper edge 41. Two or more first partial threads 49 extend outwardly from the first outer surface 43 and are spaced between the first ledge 47 and the first upper edge 41. A plurality of orifices 51, 53 extend through the first sidewall 39 and/or lower end element 37. Some or all of the plurality of orifices 51, 53 may be dimensioned such that pieces of bait or small bait fish can also pass therethrough into the surrounding aqueous media such as having a diameter of one-fourth inch or other suitable diameter. For example, the plurality of orifices 51 through the first sidewall 39 may comprise five columns of five orifices each and the plurality of orifices 53 through the lower end element 37 may be four in number, as shown in FIGS. 3 and 5.

The plurality of orifices 51, 53 operatively promote circulation of water through the food-containing member 21 to thereby distribute bait pieces and fish-attracting scent contained in the first internal cavity 45 from the food-containing member 21 into the surrounding aqueous media. The plurality of orifices through the lower end element 37 also allow worms contained in the first internal cavity 45 to crawl therethrough to attract fish to the fish attractor 10. Live bait fish visibly swimming in the food-containing member 21, being at least partially constructed of transparent or translucent material, may attract larger fish to the vicinity of the fish attractor 10.

The light-emitting member 23, which is at least partially constructed of translucent and/or transparent material, includes a battery-powered light-emitting system 54, a cylindrically shaped second sidewall 55 having a second upper edge 57, a second outer surface 59 and a lower edge 61 and surrounding a second internal cavity 63, the second sidewall 55 at the lower edge 61 being dimensioned to slidably and telescopingly engage the first sidewall 39 along the first upper edge 41 of the food-containing member 29. An horizontally oriented platform 65 is spaced apart from the lower edge 61 and forms a fluid-tight seal with the second sidewall 55. A second ledge 67 extends radially outwardly from the second outer surface 59 and is spaced apart from the second upper edge 57. Two or more second partial threads 69 extend inwardly from the second sidewall 55 near the lower edge 61 and are spaced between the second ledge 67 and the lower edge 61 wherein the two or more second partial threads 69 are dimensioned and configured to threadingly mate with the two or more first partial threads 49 to thereby removably secure the light-emitting member 23 to the food-containing member 21. Two or more third partial threads 71 extend outwardly from the second outer surface 59 and are spaced between the second ledge 67 and the second upper edge 57.

The battery-powered light-emitting system 54 includes at least one battery compartment 73 securely mounted on the platform 65 and in the second internal cavity 63. A battery 75 is removably mounted in each of the at least one battery compartment 73. A selectively activatable switch 77 is sealingly mounted in the second sidewall 55 and is operable from the second outer surface 59. At least one LED lighting device 79 is mounted in the second internal cavity 63. Circuitry 81 operably interconnects each battery 75 contained in the at least one battery compartment 73 and the at least one LED lighting device 79 with the switch 77.

The light-emitting member 23 is primarily used for subdued-lighting fishing conditions for fish which are attracted to light/dark contrasts. However, the light-emitting member 23 may also be useful for daytime applications, especially when live bait fish with light-reflecting scales are swimming around in the food-containing member 21.

The buoyancy member 25 includes a dome-shaped top element 81 having a contrastingly colored upper surface 83 and a circularly shaped peripheral edge 85. A third sidewall 87 having an inner surface 89 with a lower edge 91 depends downwardly from the peripheral edge 85 and is dimensioned to slidably and telescopingly engage the second sidewall 55. A continuous groove 93 is formed in the top element 81 along the third sidewall 87, and an O-ring 95 is positioned in the groove 93. Two or more fourth partial threads 97 extend inwardly from the inner surface 89 and are spaced adjacent to the lower edge 91, the two or more fourth partial threads 97 being dimensioned and configured to threadingly mate with the two or more third partial threads 71, to removably secure the top element 81 to the light-emitting member 23 and to compress the O-ring 95 between the groove 93 and the second upper edge 51 to thereby form a fluid-tight seal between the second sidewall 55 and the top element 81.

The sound-generating member 27 includes a tray element 101 having a tray bottom element 103 and a tray sidewall 105 having a tray upper edge 107 and surrounding a tray internal cavity 109. A plurality of spherically shaped devices 111, such as five or six or more for example, are loosely located in the tray element 101. Securing means 113, including a screw 115 or other suitable device, secure the tray element 101 to the top element 81 wherein the tray element 101 is disposed within the second internal cavity 63 of the light-emitting member 23 and the plurality of spherically shaped devices 111 are captured in the tray internal cavity 109. The securing means 113 securely clamps the tray upper edge 107 in abutting engagement with the top element 81 so sounds generated by the devices 111 are reliably and operably transmitted from the tray element 101 to the top element 81, to the light-emitting member 23 and the food-containing member 21, and into the surrounding body of water. If desired, the top element 81 may also include another downwardly depending wall 117, which is concentric with third sidewall 87 and is in abutting engagement with tray sidewall 105 when the tray element 101 is secured to the top element 81, as shown in FIGS. 3 and 4, to enhance the ability of the fish attractor 10 to transmit the sounds generated by the plurality of spherically shaped devices 111 as hereinbefore described.

The anchoring member 29 includes a first attaching device 121 secured to the lower end element 37 of the food-containing member 21. An elongate and flexible first connecting device 123, such as a cord or cable or other suitable device, has a proximal end 125 secured to the first attaching device 121. A ballast device 127 is adjustably connected to the first connecting device 123.

One of the intended purposes for the anchoring member 29 is to stabilize the location of the fish attractor 10 when in use. The length of the first connecting device 123 generally depends on the particular application for which the fish attractor 10 is being used. For example, if the fish attractor 10 is being used in water wherein the first connecting device 123 can reach the bottom of the body of water, the ballast device 127 may be secured to a length of the first connecting device 123 such that the fish attractor 10 is located at the surface of the body of water and is tethered to the location of the ballast device 127 where it rests on the bottom of the body of water.

If the ballast device 127 is heavy enough to overcome the buoyancy of the fish attractor 10 and the ballast device 127 is adjustably secured to the first connecting device 123 at a distance from the food-containing member 21 that is less than the depth of the body of water at that location, then the fish attractor 10 can be suspended in the body of water at a desired depth below the surface of the body of water. If the body of water is experiencing substantial wave activity and the first connecting device 123 is not long enough to reach the bottom of the body of water and the ballast device 127 is not heavy enough to overcome the buoyancy of the fish attractor 10, the ballast device 127 can be suspended below the major wave activity by the first connecting device 123 in order to maintain a certain amount of location stability of the fish attractor 10, similar to that obtained by shallow water ocean scuba divers for their floating inner tubes.

The retrieval mechanism 31 includes a second attaching device 131 secured to the second ledge 67 of the light-emitting member 23. An elongate and flexible second connecting device 133, such as a cord or cable or other suitable device, has a proximal end 135 secured to the second attaching device 131 and a distal end 137 for securing the fish attractor to a remote object 139, such as a boat or dock for example. One of the intended purposes for the retrieval mechanism 31 is to enable a user to easily retrieve the fish attractor 10 when a use thereof has been completed.

The position locating member 33 includes the top element 81 having a receiving mechanism 141 such as a vertically oriented partial bore 141 or other suitable arrangement, an elongate indicator device 143 such as a flag on a mast 145 removably connected to or inserted in the receiving mechanism 141 wherein the indicator device 143 extends generally vertically upwardly from the top element 81, approximately twelve inches for example. Generally, the position locating member 33 is removed when the fish attractor 10 is anchored below the surface of the body of water as hereinbefore described.

The buoyancy member 25 is structured and configured relative to the weight of the fish attractor 10 such that a substantial portion of the height, preferably approximately twenty-five percent, of the fish attractor 10 between the uppermost extremity of the top element 81 and the lowermost extremity of the food-containing member 21 is operatively buoyed above the surface of the body of water and wherein pitching and rolling of the fish attractor 10 arising from wave activity of the body of water causes the plurality of spherically shaped devices 111 to roll around in the tray element 101, thereby colliding with each other and with the tray sidewall 105 and generating audio which emulates fish clicking sounds.

Preferably, the fish attractor 10 also includes a supporting base 147 which is structured and configured to stabilize the food-containing member 21 in an upright orientation on a level, and also on, an uneven supporting surface, as the fish attractor 10 is being prepared for use and while the various components of the fish attractor 10 are being assembled on the food-containing member 21.

In an application of the fish attractor 10 of the present invention, a user removes the light-emitting member 23 from atop the food-containing member 21, places bait and/or small bait fish and/or scent-producing material in the first internal cavity 45, and threadingly remounts the light-emitting member 23 on the food-containing member 21. The ballast device 127 is secured to the first connecting device 123 at a desired distance from the lower end element 37. If it is nighttime, the light-emitting member 23 may be switched on.

If the user desires to disable the sound-producing feature of the fish attractor 10, the top element 81 is removed from the light-emitting member 23, the tray element 101 is unsecured from the top element 81, and the spherically shaped devices 111 are removed from the tray element 101. The top element 81, with or without the tray element 101, is then threadingly remounted atop the light-emitting device 23 to re-establish the fluid-tight characteristic of the buoyancy member 25

The indicator device 143 may be secured to the receiving mechanism 141 and the fish attractor 10 is placed in a body of water at a location where the user desires to attract fish. When fish activity is observed in the vicinity of the fish attractor 10, the user may place other appropriate gear in the water near the fish attractor 10 in an attempt to catch the fish being attracted to the fish attractor 10.

It is to be understood that each of the functions of the fish attractor 10, namely, the bait- and scent-distribution, light emission and/or sound production, can be used singly or in combination with selected ones, or all, of the other functions, as desired.

It is also to be understood that while certain forms of the present invention have been illustrated and described herein, it is not to be limited to the specific forms or arrangement of parts described and shown.

What is claimed and desired to be covered by Letters Patent is:

1. A fish attractor for attracting fish in a body of water, the fish attractor comprising:
   (a) a cylindrically shaped food-containing member having a lower end element, a first sidewall surrounding a first internal cavity, and a plurality of orifices through the first sidewall and/or the lower end element, the food-containing member being constructed at least partially of translucent and/or transparent material;
   (b) a cylindrically shaped light-emitting member constructed at least partially of translucent and/or transparent material and removably mounted on the food-containing member, the light-emitting member including a battery-powered, light-emitting system;
   (c) a buoyancy member including a top element removably and sealingly mounted on the light-emitting member;
   (d) a sound-generating member including a plurality of spherically shaped elements loosely spaced therein, the sound-generating member being secured to the top element and being disposed within the light-emitting member;
   (e) an anchoring member secured to the food-containing member; and
   (f) a retrieval mechanism secured to the light-emitting member; and
   (g) wherein a substantial portion of the fish attractor is operatively buoyed above the surface of the body of water, and wherein pitching and rolling of the fish attractor causes the plurality of spherically shaped devices to roll around in the sound-generating member and to collide with each other and with the tray to thereby generate audio emulating fish clicking sounds.

2. A fish attractor as described in claim 1, further comprising:
   (a) the food-containing member including:
      (1) a cylindrically shaped first sidewall having a first upper edge and a first outer surface,
      (2) a first ledge extending radially outwardly from the first outer surface and spaced apart from the first upper edge, and
      (3) two or more first partial threads extending outwardly from the first outer surface and spaced between the first ledge and the first upper edge;
   (b) the light-emitting member including:
      (1) a cylindrically shaped second sidewall having a second outer surface, a second upper edge and a lower edge, the second sidewall at the lower edge dimensioned to slidably and telescopingly engage the first sidewall of the food-containing member, and
      (2) two or more second partial threads extending inwardly from the second sidewall and spaced near the lower edge, the two or more second partial threads being dimensioned and configured to threadingly mate with the two or more first partial threads; and
   (c) wherein the light-emitting member is removably securable on the food-containing member by threadingly mating the two or more second partial threads with the two or more first partial threads.

3. A fish attractor as described in claim 2, further comprising:
   (a) the light-emitting member including:
      (1) a second ledge extending radially outwardly from the second outer surface and spaced apart from the second upper edge, and
      (2) two or more third partial threads extending outwardly from the second outer surface and spaced between the second ledge and the second upper edge; and
   (b) the buoyancy member including:
      (1) a dome-shaped top element having a contrastingly colored upper surface and a circularly shaped peripheral edge,
      (2) a third sidewall having an inner surface with a lower edge, the third sidewall depending downwardly from the peripheral edge and being dimensioned to slidably and telescopingly engage the second sidewall,
      (3) a groove formed in the top element along the third sidewall,
      (4) an O-ring positioned in the groove, and (5) two or more fourth partial threads extending inwardly from the inner surface and spaced adjacent to the lower edge, the two or more fourth partial threads being dimensioned and configured to threadingly mate with the two or more third partial threads, thereby removably securing the top element to the light-emitting member; and (c) wherein the top element is removably securable to the light-emitting member by threadingly mating the two or more fourth partial threads with the two or more third partial threads and compressing the O-ring between the groove and the second upper edge to thereby form a fluid-tight seal between the second sidewall and the top element.

4. A fish attractor as described in claim 3, further comprising the sound-generating member including:

(1) a tray element having a tray bottom element and a tray sidewall having a tray upper edge and surrounding a tray internal cavity, (2) the plurality of spherically shaped elements being spaced loosely in the tray element, and (3) wherein the plurality of spherically shaped elements are captured in the tray internal cavity.

5. A fish attractor as described in claim 4, further comprising the top element including another downwardly depending wall which is concentric with the third wall and abuttingly engages the tray sidewall when the tray element is secured to the top element.

6. A fish attractor as described in claim 1, wherein:

(a) the light-emitting member further including:

(1) a cylindrically shaped second sidewall having a second outer surface and a lower edge and surrounding a second internal cavity, the second sidewall at the lower edge dimensioned to slidably and telescopingly engage the first sidewall of the food-containing member, and (2) an horizontally oriented platform spaced apart from the lower edge, forming a fluid-tight seal with the second sidewall, and further forming a second internal cavity spaced within the second sidewall and above the platform; and (b) the battery-powered light-emitting system includes:

(1) at least one battery compartment securely mounted on the platform and in the second internal cavity, (2) a battery removably mounted in each at least one battery compartment, (3) a selectively activatable switch sealingly mounted in the second sidewall and operable from the second outer surface, (4) at least one LED lighting device mounted in the second internal cavity, and (5) circuitry interconnecting each battery contained in each at least one battery compartment and the at least one LED lighting device with the switch.

7. A fish attractor as described in claim 1, wherein the anchoring member includes:

(a) a first attaching device secured to the food-containing member;

(b) an elongate and flexible first connecting device having a proximal end secured to the first attaching device; and (c) a ballast device adjustably connected to the first connecting device.

8. A fish attractor as described in claim 1, wherein the retrieval mechanism includes:

(1) a second attaching device secured to the light-emitting member; and (2) an elongate and flexible second connecting device having a proximal end secured to the second attaching device and a distal end for securing the fish attractor to a remote object.

9. A fish attractor as described in claim 1, further comprising a location indicating member including:

(a) the top element having a receiving mechanism, and (b) an elongate indicator device removably connected to the receiving mechanism and operably extending generally vertically upwardly from the top element.

10. A fish attractor as described in claim 1, the buoyancy member being structured and dimensioned wherein the height of the fish attractor operatively buoyed above the surface of the body of water is approximately one-fourth of the distance between the uppermost extremity of the top element and the lowermost extremity of the food-containing member.

11. A fish attractor as described in claim 1, further comprising a supporting base structured and configured to enable a user to stabilize the food-containing member in an upright orientation on level or uneven ground while preparing the fish attractor for use and while the various components of the fish attractor are being assembled on the food-containing member.

12. A fish attractor for attracting fish in a body of water, the accessory comprising:

(a) a food-containing member constructed at least partially of translucent and/or transparent material, the food-containing member including:

(1) a lower end element, (2) a cylindrically shaped first sidewall having a first upper edge, a first outer surface, and surrounding a first internal cavity, (3) a first ledge extending radially outwardly from the first outer surface and spaced apart from the first upper edge, (4) two or more first partial threads extending outwardly from the first outer surface and spaced between the first ledge and the first upper edge, and (5) a plurality of orifices through the first sidewall and/or the lower end element;

(b) a light-emitting member constructed at least partially of translucent and/or transparent material, the light-emitting member including:

(1) a cylindrically shaped second sidewall having a second outer surface and a lower edge, the second sidewall at the lower edge dimensioned to slidably and telescopingly engage the first sidewall of the food-containing member, (2) two or more second partial threads extending inwardly from the second sidewall and spaced near the lower edge, the two or more second partial threads being dimensioned and configured to threadingly mate with the two or more first partial threads; wherein the light-emitting member is removably securable on the food-containing member by threadingly mating the two or more second partial threads with the two or more first partial threads, (3) an horizontally oriented platform spaced apart from the lower edge, forming a fluid-tight seal with the second sidewall, and further forming a second internal cavity spaced within the second sidewall and above the platform, (4) at least one battery compartment securely mounted on the platform and in the second internal cavity, (5) a battery removably mounted in each at least one battery compartment, (6) a selectively activatable switch sealingly mounted in the second sidewall and operable from the second outer surface, (7) at least one LED lighting device mounted in the second internal cavity, and (8) circuitry interconnecting each battery contained in each at least one battery compartment and the at least one LED lighting device with the switch;

(c) a buoyancy member including:

(1) a dome-shaped top element having a contrastingly colored upper surface and a circularly shaped peripheral edge, (2) a third sidewall having an inner surface with a lower edge, the third sidewall depending downwardly from the peripheral edge and being dimensioned to slidably and telescopingly engage the second sidewall, (3) a groove formed in the top element along the third sidewall, (4) an O-ring positioned in the groove, and (5) two or more fourth partial threads extending inwardly from the inner surface and spaced adjacent to the lower edge, the two or more fourth partial threads being dimensioned and configured to threadingly mate with the two or more third partial threads, thereby removably securing the top element to the light-emitting member and compressing the O-ring between the groove and the first upper edge to thereby form a fluid-tight seal between the first sidewall and the top element;

(d) a sound-generating member including:

(1) a tray element having a tray bottom element and a tray sidewall having a tray upper edge and surrounding a tray internal cavity, (2) a plurality of spherically shaped elements spaced loosely in the tray element, and (3) securing means for securing the tray element to the top element wherein the tray element is disposed within the second internal cavity of the light-emitting member and the plurality of spherically shaped elements are captured in the tray internal cavity;

(e) an anchoring member including:

(1) a first attaching device secured to the lower end element of the food-containing member, (2) an elongate and flexible first connecting device having a proximal end secured to the first attaching device, and (3) a ballast device adjustably connected to the first connecting device;

(f) a retrieval mechanism including:

(1) a second attaching device secured to the first ledge of the food-containing member, and (2) an elongate and flexible second connecting device having a proximal end secured to the second attaching device and a distal end for securing the fish attractor to a remote object; and (g) a location indicating member including:

(1) the top element having a receiving mechanism, and (2) an elongate indicator device removably connected to the receiving mechanism and extending generally vertically upwardly from the top element; and (h) wherein a substantial portion of the fish attractor is operatively buoyed above the surface of a body of water and wherein pitching and rolling of the fish attractor causes the plurality of spherically shaped devices to roll around in the tray element colliding with each other and with the tray sidewall thereby generating audio emulating fish clicking sounds.

* * * * *